Oct. 3, 1967

J. E. METCALFE 3,345,544

SOLID ALUMINUM CAPACITORS HAVING A
PROTECTED DIELECTRIC OXIDE FILM

Filed May 17, 1965

INVENTOR
JAMES E. METCALFE

BY
*Robert Cumin*

ATTORNEY

United States Patent Office 3,345,544
Patented Oct. 3, 1967

3,345,544
SOLID ALUMINUM CAPACITORS HAVING A PROTECTED DIELECTRIC OXIDE FILM
James E. Metcalfe, Greenfield, Ind., assignor to P. R. Mallory & Co. Inc., Indianapolis, Ind., a corporation of Delaware
Filed May 17, 1965, Ser. No. 456,112
28 Claims. (Cl. 317—230)

ABSTRACT OF THE DISCLOSURE

A solid aluminum electrolyte capacitor having a protective film over the dielectric film thereof.

---

The present invention relates to electrolytic capacitors and more particularly relates to a novel solid electrolyte aluminum capacitor.

Solid electrolyte tantalum capacitors are well known in the art. Because of the high dielectric constant of tantalum and its property of being readily sintered, anodized and treated with $Mn(NO_3)_2$ without damage to the oxide film, small, highly reliable units have been produced. While aluminum is far more economical than tantalum, aluminum has a lower dielectric constant which has heretofore necessitated a far larger unit than a tantalum unit having the same capacitance.

There have been a number of attempts to fabricate solid electrolyte aluminum capacitors having comparable characteristics with the solid tantalum capacitors. However, the problems encountered in the fabrication of solid electrolyte aluminum capacitors are so numerous and varied that while several types of solid electrolyte aluminum capacitors have been fabricated, they fall short of the properties of solid electrolyte tantalum capacitors and are limited in their applications. For the most part, the existing solid electrolyte aluminum capacitors have a high leakage rate and dissipation factor which are undesirable in circuits.

Prior attempts to fabricate solid aluminum capacitors have been made both with sintered slug aluminum anodes and etched aluminum foil anodes. The fabrication of sintered aluminum anodes is expensive and difficult, and is in itself a major hurdle which has not heretofore been satisfactorily solved. The foil has presented a problem in that the etch ratios obtained by current methods are approximately 10:1 at 100–150 v. formations. Therefore a wound, corrugated, etc., structure must be employed to obtain the desired capacitance in small volumes. The aluminums heretofore have not approached the tantalums in size.

The next problem encountered in the fabrication of solid electrolyte aluminum capacitors is the damage to the $Al_2O_3$ dielectric film by both water and $Mn(NO_3)_2$. Many attempts to fabricate the aforementioned device failed to realize that water as well as $Mn(NO_3)_2$ damages the dielectric oxide film. Therefore, after anodizing, the anodes were dipped in boiling water to clean them prior to $MnO_2$ deposition. When the $Mn(NO_3)_2$ was applied and the destruction of the oxide film noted, it was assumed that the $Mn(NO_3)_2$ was the sole cause. Attempts have been made to protect the dielectric film by forming an excessive $Al_2O_3$ barrier film or a hydrated form of $Al_2O_3$ on top of the dielectric film. This protective film is attacked by water during cleaning and then by the $Mn(NO_3)_2$. In order to control this method, times and temperatures are so critical that a difference of several seconds or a variation in temperature will damage the dielectric film. The barrier film has been used in the art in an attempt to allow the anode to be contacted with $Mn(NO_3)_2$ until it has been converted to $MnO_2$. This step, although used in most techniques today to produce solid aluminum capacitors, is costly, time-consuming, must be varied for various electrolytes and leaves no tolerances as to times and temperatures. Because of the strict tolerances which are difficult to adhere to, the resulting units have high dissipation factors and leakage currents.

For the above reasons there has been a long standing need in the art to provide a solid aluminum capacitor of comparable size and performance to that of solid tantalum capacitors. The present invention meets that need.

It is an object of the present invention to provide an improved solid electrolyte aluminum capacitor which overcomes the disadvantages of the prior art.

Therefore, it is an object of the present invention to provide a solid electrolyte aluminum capacitor having low leakage values, low DF and high volumetric efficiency.

It is an object of the present invention to provide a unique means for etching aluminum foil wire anodes so as to produce a higher CV product/gm. than that of tantalum.

It is an object of the present invention to provide a means for protecting the $Al_2O_3$ dielectric film from attack by both water and manganese nitrate.

It is an object of the present invention to provide a means for applying an $MnO_2$ electrolyte layer on an aluminum anode of sufficient quality so as to allow the application of graphite to lower the dissipation factor of the resulting capacitor.

It is an object of the present invention to provide an economical and efficient means for housing the solid aluminum of the present invention which readily lends itself to automation.

It is an object of the present invention to provide a solid aluminum capacitor of the same size and/or smaller than solid tantalum capacitors of the same rating.

It is an object of the present invention to provide a solid electrolyte aluminum foil capacitor having the same characteristics and therefore being capable of duplicating the applications of the more expensive solid tantalum capacitors.

The present invention in another of its aspects, relates to novel features of the instrumentalities described herein for teaching the principal object of the invention and to the novel features employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Figure 9:
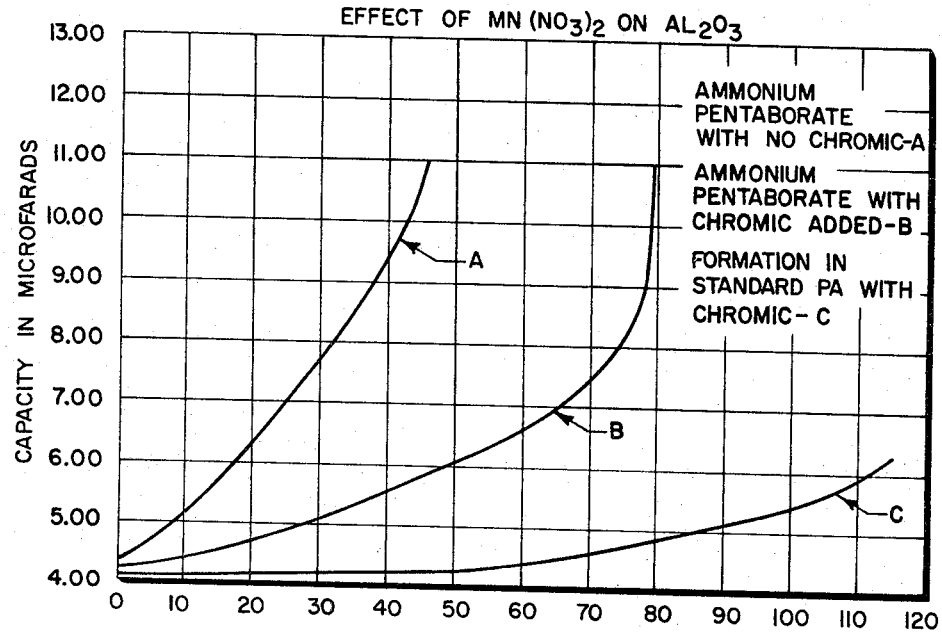

FIGURE 9 graphically illustrates the effect of

Figure 10:
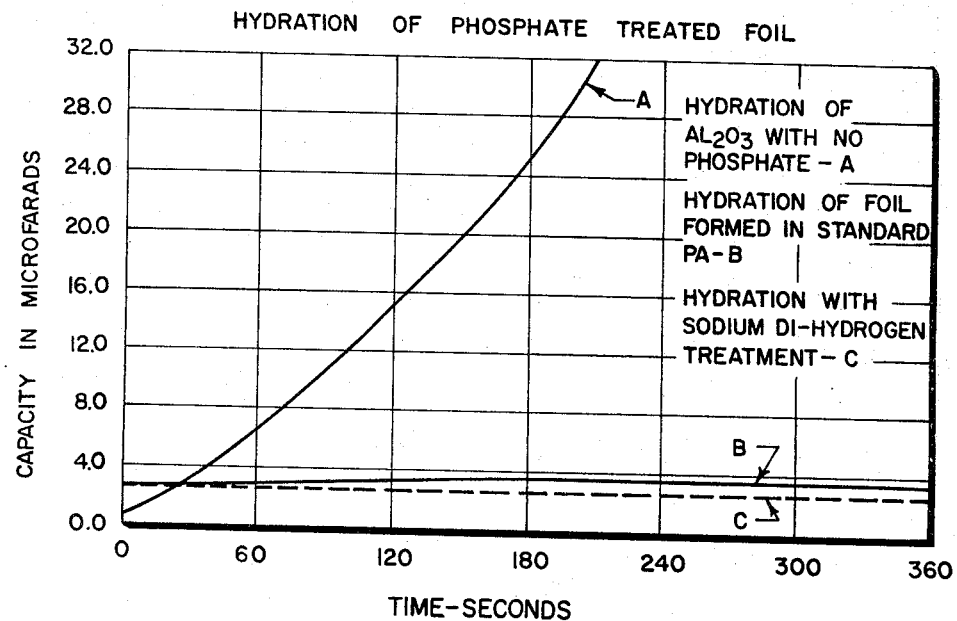
Figure 11:
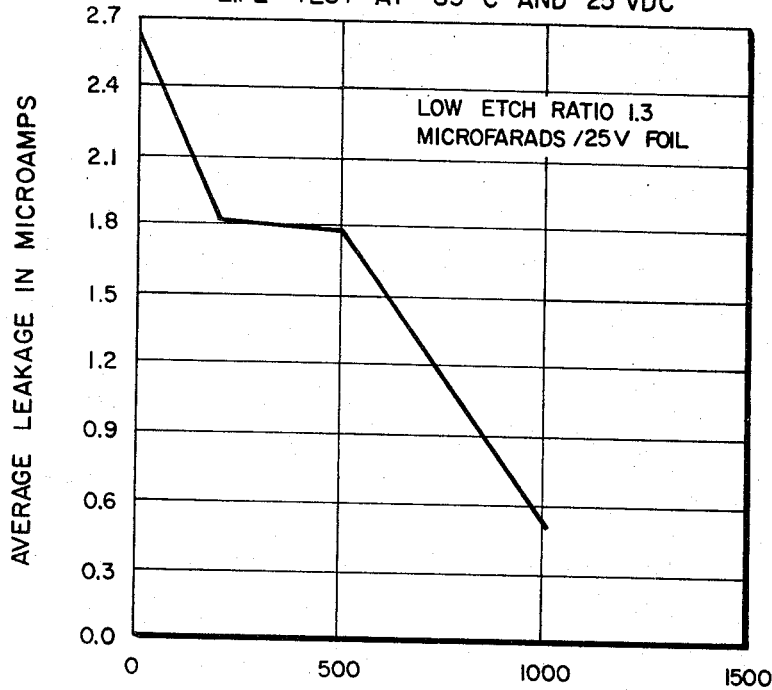
Figure 12:
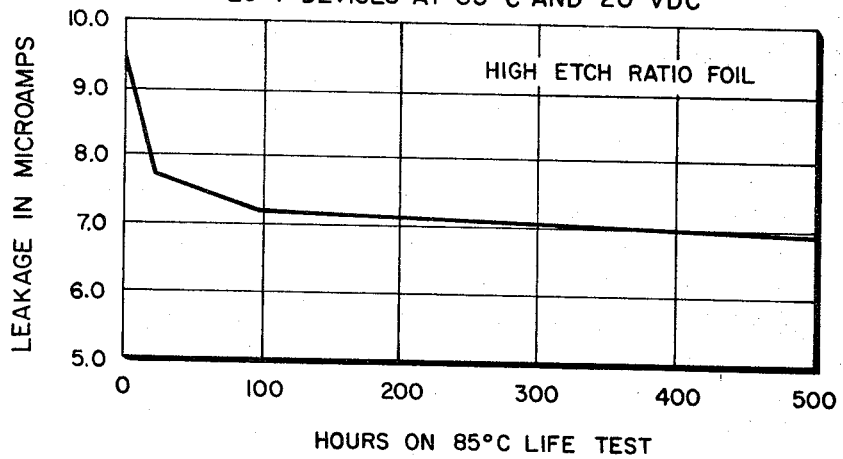
Figure 13:
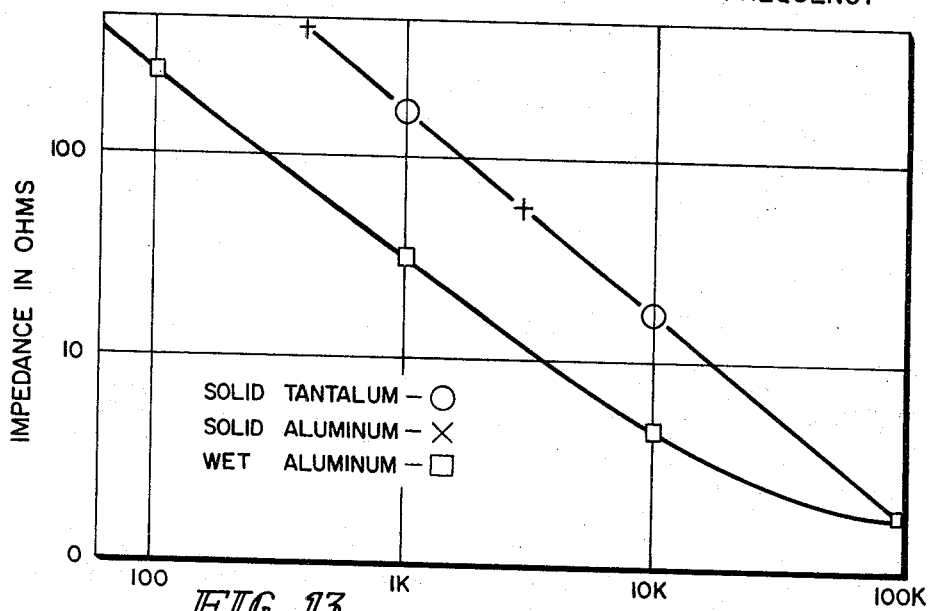
Figure 14:
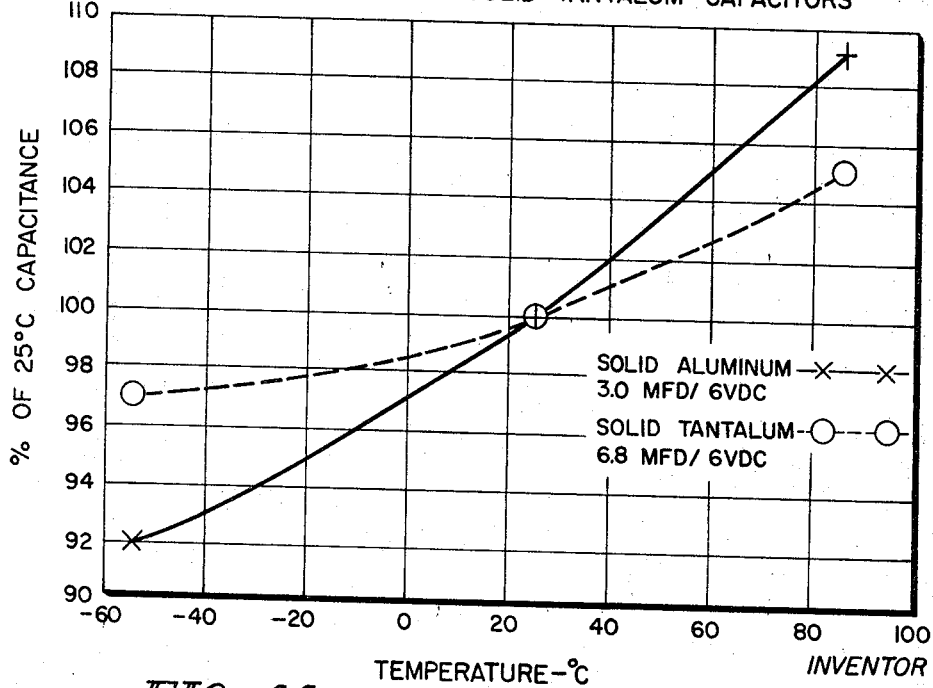
Figure 15:
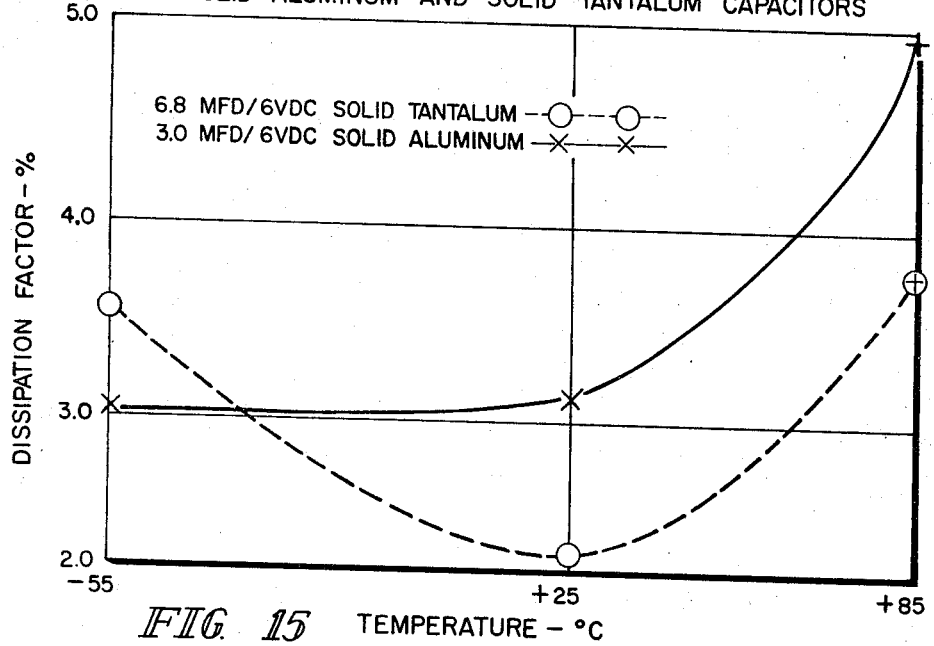
Figure 16:
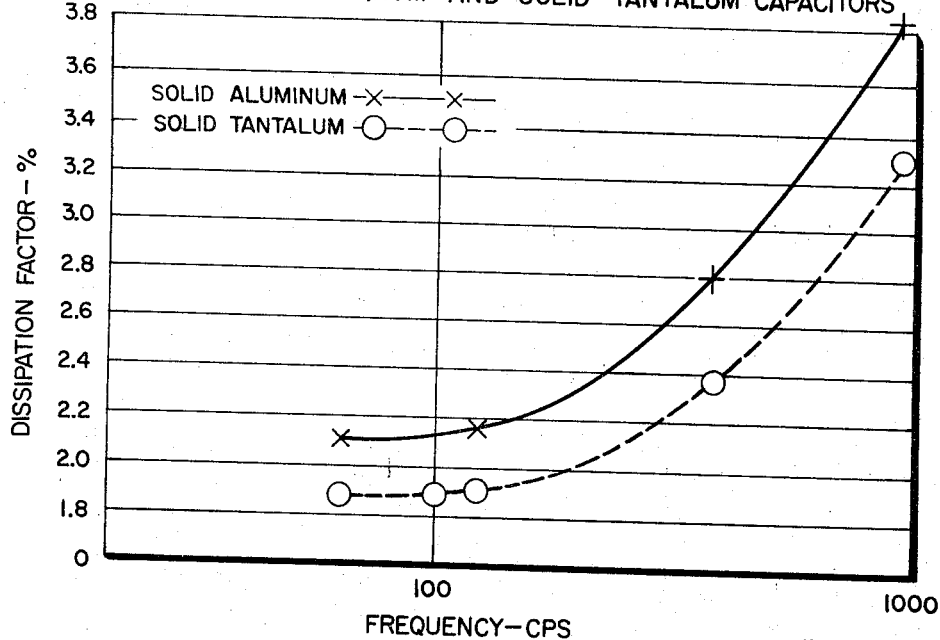
Figure 17:
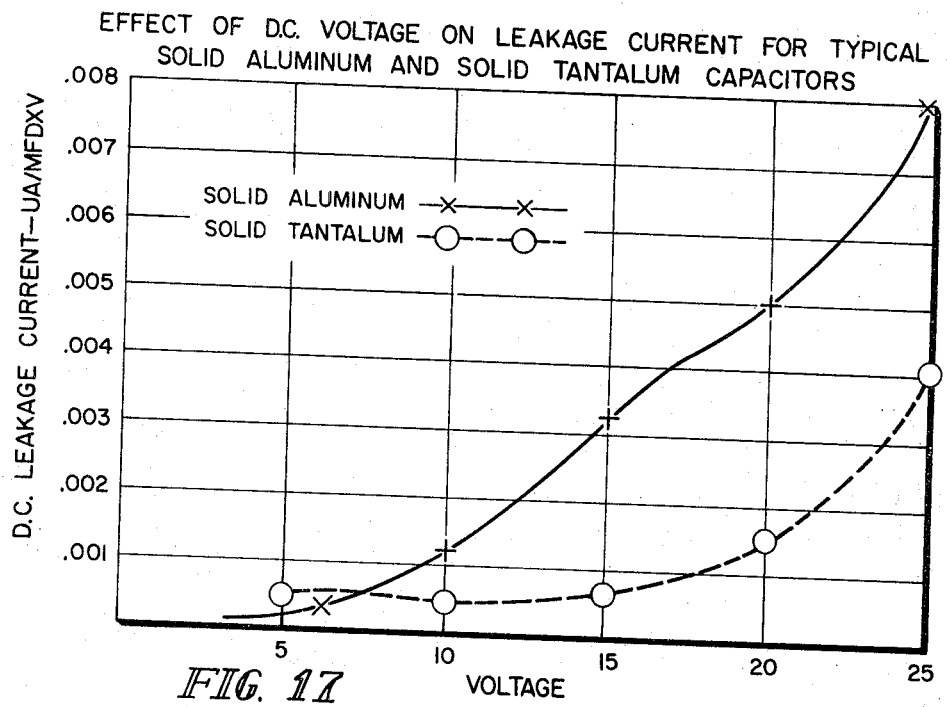
Figure 18:
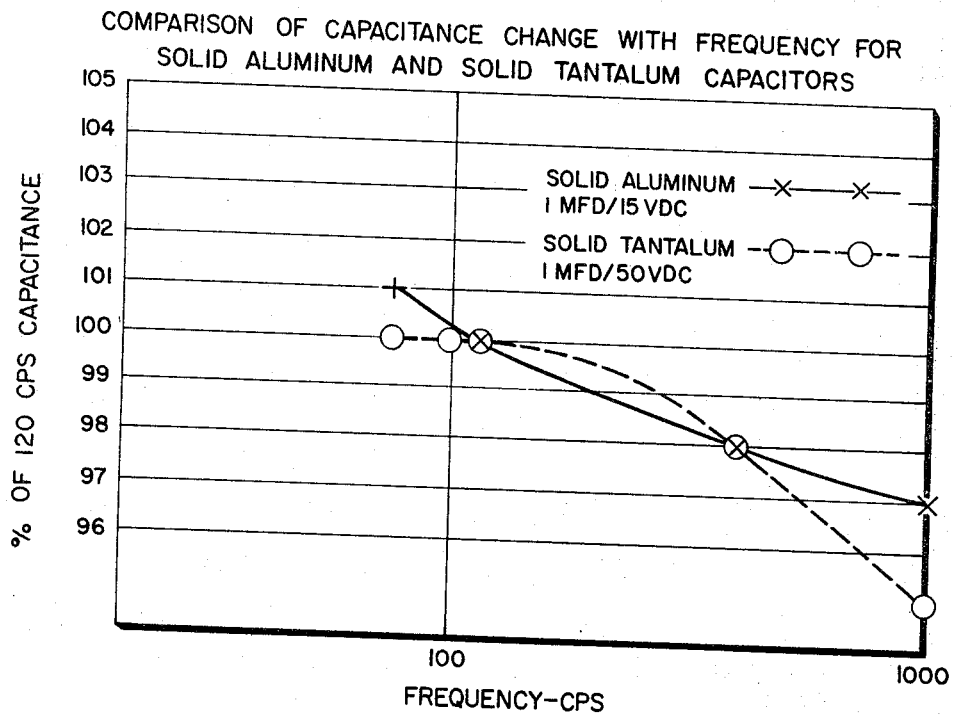
Figure 19:
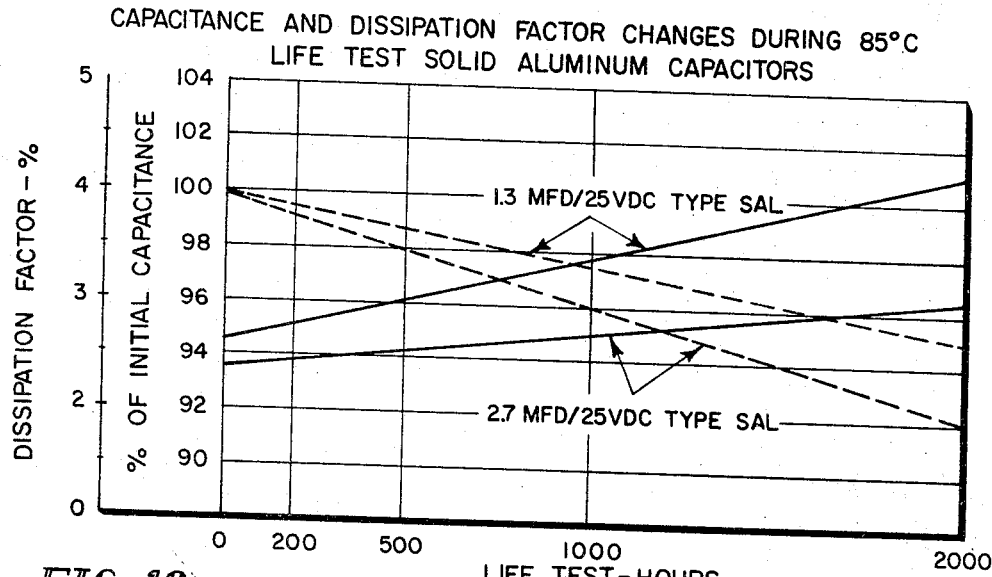
Figure 20:
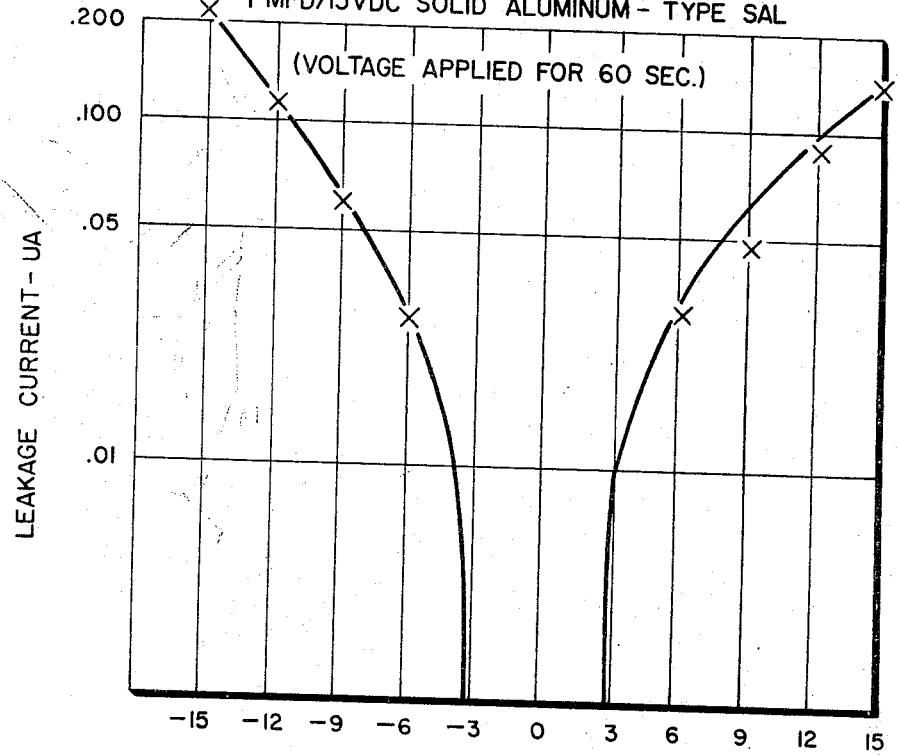

on $Al_2O_3$ with and without the protective coating provided by the present invention;

FIGURE 10 graphically illustrates the effect of hydration on the capacitance of foil with and without the protective coating provided by the present invention;

FIGURE 11 graphically illustrates the average leakage of foil anodes having the low etch ratio that is currently produced in the art;

FIGURE 12 graphically illustrates the average leakage of the high etch ratio foil anodes used in the present invention;

FIGURE 13 is a graphic comparison of impedance variations with frequency for solid aluminum, solid tantalum and wet aluminum capacitors;

FIGURE 14 is a graphic comparison of capacitance changes with temperature for solid aluminum and solid tantalum capacitors;

FIGURE 15 is a graphic comparison of dissipation factor changes with temperature for solid aluminum and tantalum capacitors;

FIGURE 16 is a graphic comparison of dissipation factor change with frequency for solid aluminum and tantalum capacitors;

FIGURE 17 is a graphic comparison of the D.C. voltage and leakage current for solid aluminum and solid tantalum capacitors;

FIGURE 18 is a graphic comparison of capacitance change with frequency for solid aluminum and solid tantalum capacitors;

FIGURE 19 is a graphic illustration of the dissipation factor and capacitance changes during 85° C. life tests of the solid aluminum capacitors of the present invention; and FIGURE 20 is a graphic illustration of normal and exceptionally low reverse leakage currents of a solid aluminum capacitor.

Generally speaking, the present invention provides a method for obtaining a unique solid electrolyte aluminum capacitor having comparable characteristics with low voltage, high capacitance solid electrolyte tantalum capacitors. Aluminum foil is etched in a NaCl etch bath containing from 3%–6% by weight of a boric acid salt. The addition of boric acid to the etch bath increases the etch ratio from about 10:1 to about 100:1 for 100–150 v. formations. The etched anodes are then treated in a dilute, boiling solution of an inorganic chromate or phosphate to provide a protective film which is impervious to both hydration and $Mn(NO_3)_2$ attack. The anode is then graphited, a cathode layer and lead are provided, and the resulting capacitor body is provided with a suitable housing.

The capacitors fabricated according to the present invention are operable from −60° to +100° C. and thus far have been produced to operate from approximately 3 volts to 100 volts. The characteristics of the capacitors fabricated by the method of the present invention are comparable to or surpass those of corresponding solid tantalum capacitors as illustrated in FIGURES 9–21.

In the practice of the present invention, aluminum foil or wire formed between 100–150 v. and having an etch ratio of at least 100:1 is utilized. Etch ratios produced by methods known in the art are approximately 10:1. The high-etch ratio foil or wire has a CV product of about 6300 mfd.-v./gm. of Al foil as opposed to the CV product of 2000 mfd.-v./gm. Ta. It was previously thought that the aforementioned CV product for aluminum was impossible to attain nor could the solid aluminum CV product even approach that of tantalum. For that reason, it was further thought to be impossible to fabricate solid aluminum electrolytic capacitors having comparable characteristics with solid tantalums without being much larger than the tantalum units. However, the higher CV product of the high-etch aluminum foil over sintered tantalum anodes gives the anodes produced by the present invention a weight advantage over the existing tantalum anodes. Since aluminum's CV product is 3 times greater than that of tantalum, and as the cost of tantalum per pound is approximately 14 times that of aluminum, far more economical units are attained with aluminum.

The high etch ratio is obtained by the addition of boric acid or a salt of boric acid to the etching solution. The foil is cleaned in a caustic solution, immersed in the etching solution and then cleaned in nitric acid.

The etch solution consists essentially of a saturated NaCl solution containing from 3%–15% boric acid by weight. While more boric acid may be utilized, larger amounts do not affect the etch ratio. The foil is etched for approximately 10 minutes at 95–100° C.

The high-etch ratio foil used in the practice of the present invention has such deep pits that the etched foil resembles a sintered tantalum slug. The etched foil or wire utilized in the present invention overcomes the first hurdle encountered in the prior art, that is, providing a small, satisfactory anode.

The second problem encountered in the fabrication of solid aluminum electrolytic capacitors has been the application of the manganese nitrate to the anode. As was previously mentioned, it has been known in the art that manganese nitrate attacks and strips the formed $Al_2O_3$ dielectric film from the aluminum. The aforementioned attempts to prevent said attack have been unsuccessful and at best have resulted in poor quality capacitors having high leakage rates, high dissipation factors.

One factor overlooked by many approaches taken in the prior art is that water also attacks the $Al_2O_3$ film. Thus when anodes were washed in boiling water prior to the application of $Mn(No_3)_2$, the corrosion of the $Al_2O_3$, which increases with increasing temperature, was initiated.

The effect of water on the $Al_2O_3$ film is readily measurable. While a discrete thickness of the oxide film is desirable for good performance, as the thickness of the $Al_2O_3$ film is increased, the capacitance decreases, and as the thickness of the film decreases the capacitance increases. A sudden high surge of the capacitance value indicates defects in the oxide film and defects lead to both high leakage rates and dissipation factors. As graphically represented in FIGURE 9, anodized foil which had been formed in the absence of the protective coating provided by the present invention was immersed in boiling water. As can be seen by curve A, the $Al_2O_3$ was rapidly hydrated as the capacitance rose from approximately 0.5 to 33 mfd. in less than 4 minutes.

It appears from curve B that phosphoric acid formation forms a protective film which is resistant to water of hydration. However, the use of a dilute solution of an inorganic phosphate following the formation of the soil or wire in an aqueous phosphoric acid solution forms a protective coating which is completely impervious to water of hydration as is evidenced by curve C wherein no change in capacitance is observed even after 6 minutes of immersion in boiling water.

Chromates have also been found to form the desired protective film as shown in FIGURE 9. Curve A represents the measured attack by $Mn(NO_3)_2$ on an oxide formed in a standard ammonium pentaborate solution. As evidenced by the sharp increase in capacitance, the $Mn(NO_3)_2$ immediately attacks the $Al_2O_3$. As shown by curve B, treatment of the formed anode in an inorganic chromate solution forms some protection. The attack, although more gradual, is still too rapid to be satisfactory. However, a phosphoric acid formation followed by chromate treatment forms a protective coating which retards the attack by $Mn(NO_3)_2$ for over 50 seconds. The attack remains slight even after 110 seconds. The 50 seconds allowed by the phosphate formation and chromate treatment is to be contrasted with the several seconds allowed by the hydration method currently used in the art for applying and converting $Mn(NO_3)_2$ to $MnO_2$. It has further been found that the phosphoric acid formation followed by treatment with an inorganic phosphate allows a much longer time for conversion than even the chromate-phosphoric acid combination which is in itself a significant improvement over the prior art.

The treatment of the formed foil for at least 4 minutes in boiling water containing up to 2% by weight of an inorganic phosphate or chromate is a major step in the protection of the formed oxide on the foil. The resulting protective film prevents corrosion of the dielectric oxide film by both hydration and $Mn(NO_3)_2$ without affecting the performance of the capacitor.

Inorganic phosphates such as $Na_3PO_4$, $Na_2HPO_4$ and $NaH_2PO_4$ or any other phosphate which will ionize at a pH of 7 is suitable in the practice of the present invention. Similarly, inorganic chromates such as $Na_2CrO_4$, $Na_2Cr_2O_7$, $K_2CrO_4$, $K_2Cr_2O_7$ and the like are suitable to provide the protective film.

Two percent by weight of the phosphates or chromates in an aqueous solution produces optimum results. The process is operable from 30° C. to 100° C., but optimum results are obtained with a boiling solution.

The aforementioned processes overcome the problem encountered in the prior art in the application and conversion of $Mn(NO_3)_2$ to $MnO_2$ and thereby eliminate the high leakage and high dissipation factor and thereby the very limited application of the solid aluminum capacitors known in the art. The process further eliminates the expensive and complex process and unsatisfactory step of hydrating the formed $Al_2O_3$ in an attempt to provide a protective barrier for the application of $Mn(NO_3)_2$ to the anode and results in an economical unit.

A further advantage of the process as herein disclosed is that the resulting $MnO_2$ film may be coated with graphite which gives a much lower dissipation factor than found in units without the graphite. This step was heretofore impossible in prior solid aluminum devices, as the imperfections in the $Al_2O_3$ film and hence the $MnO_2$ layer caused the anode to short out when graphite was applied.

A cathode coating is then applied to the treated wire or foil and a cathode lead attached thereto. When foil is used, the anode lead is attached prior to treatment. When wire anodes are used, the unformed portion of the wire serves as the anode lead. The units are then provided with a suitable housing and are thereby completed.

While any suitable sealing or encapsulating means or housing may be employed, the method represented by FIGURES 1–7 is shown as being illustrative of an extremely economical way of encapsulating the units where hermetic seals are not required.

Figure 1:
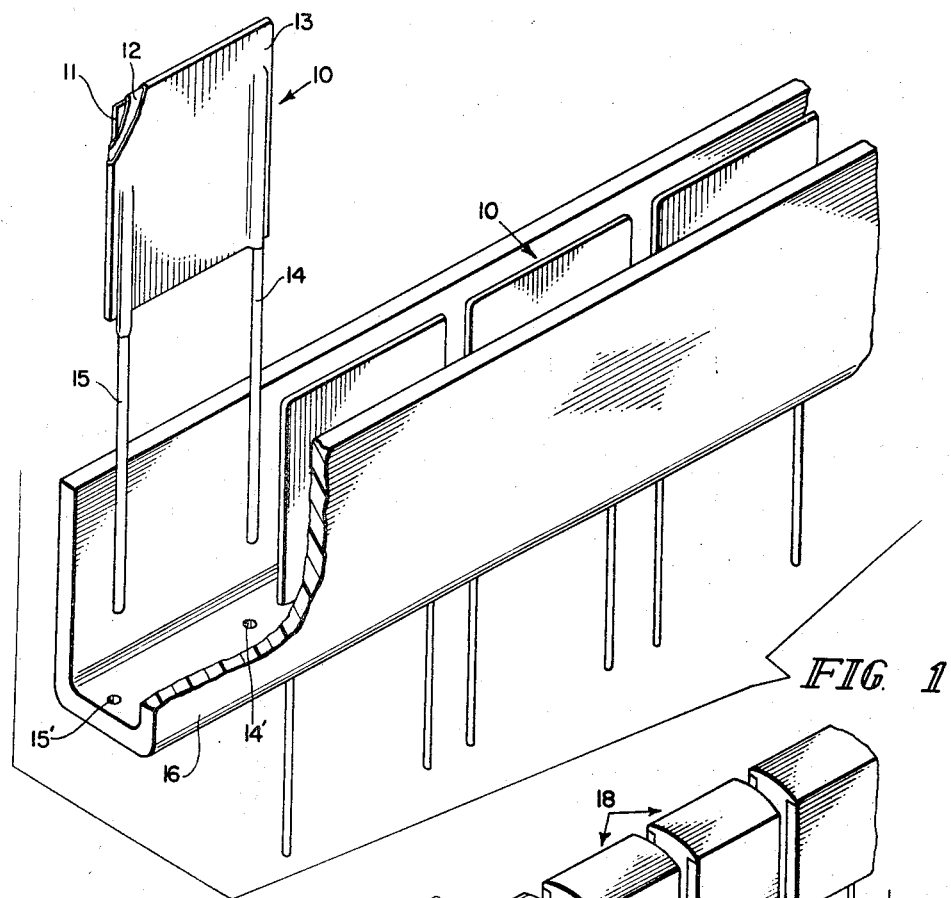
FIGURE 1 is a perspective view of one method of mounting the individual units into a molding channel.

Reference is now made to the drawings which show the final stages of capacitor fabrication. In FIGURE 1 a plurality of capacitor units 10 comprising a formed aluminum foil anode 11, an $MnO_2$ film 12, an optical graphite layer (not shown) and a cathode layer 13 which may be silver epoxy or any other suitable cathode material, anode lead 14, and cathode lead 15 are positioned in molded channel 16. The positioning is effected by aligning the leads 14 and 15 of the units with apertures 14' and 15' in the channel 16. Molten epoxy is then poured in to the channel to encapsulate capacitors 10. The molten material is compatible with the material of the channel so that complete coalescence is obtained. The units are then treated so as to cure the epoxy.

Figure 2:
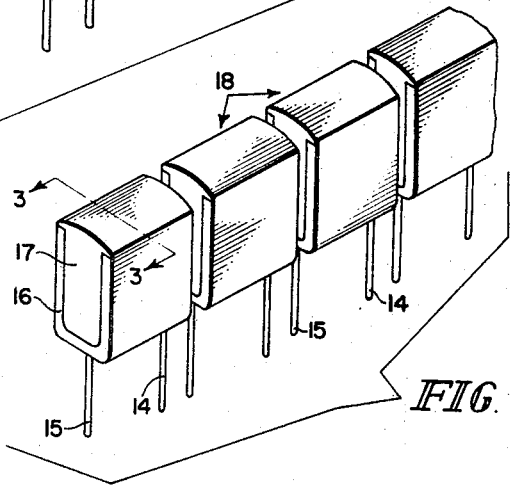
FIGURE 2 is a perspective view of the completed capacitors.

In FIGURE 2 the completed capacitors 18 are shown after having been isolated from each other by a suitable cutting technique. It can be seen that thermoplastic material 17 has filled in the void in channel 16 and completely encapsulated the capacitor 18.

Figure 3:
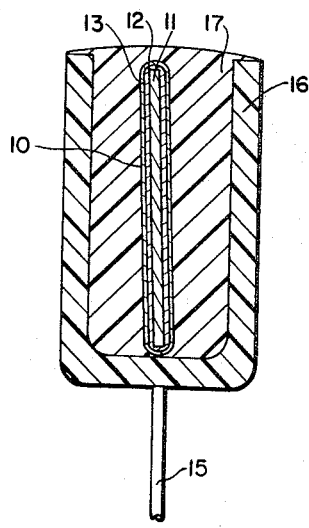
FIGURE 3 is a sectional view of a completed capacitor taken through section 3—3 of FIGURE 2.

FIGURE 3 is a sectional end view of capacitor 18 taken through section 3—3 of FIGURE 2. It can be seen that capacitor 10 comprising anode 11, $MnO_2$ film 12, graphite layer (not shown) and cathode 13 is completely encapsulated by the thermoplastic material 17 which has coalesced with the channel 16 and that the leads extend from the channel for easy access. It should be noted that the encapsulation is meant to protect the unit but not hermetically seal it. Capacitor 10 may be molded, or hermetically sealed, or utilized in conjunction with any other suitable packaging means.

Figure 4:
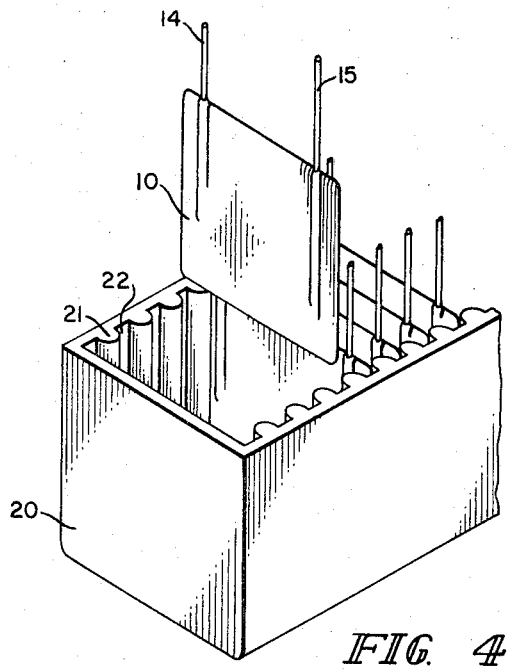
FIGURE 4 is a perspective view of a second method of mounting the individual units for encapsulation.

The units as shown in FIGURES 1–3 have a relatively thick coating of epoxy surrounding and protecting the capacitor. A second method of mounting the capacitors in the channel which not only facilitates mounting, but allows approximately 200 units to be easily positioned into the channel is shown in FIGURES 4 and 5.

Channel 20, having ribs 21 integrally formed therein, allows the capacitors 10 to be dropped into the slots 22 formed by the ribs. This eliminates having to align the capacitor leads with the apertures therefor in the channel and further allows approximately 200 capacitors to be aligned in a single 24-inch channel. After the epoxy 23 has been poured into the channel and cured, the units are separated by an automatic cutting means.

Figure 5:
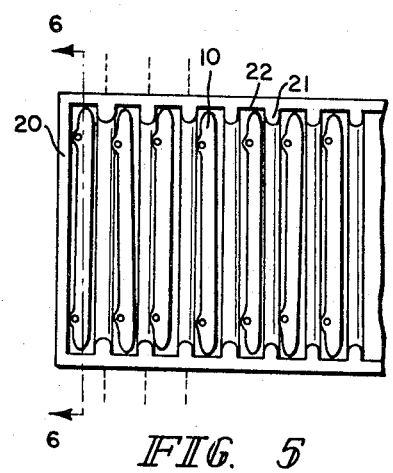
FIGURE 5 is a top view of the molded channel and positioned units.

In FIGURE 5 a top view of channel 20 having the capacitors positioned therein is shown. The dotted lines indicate the point at which the units will be separated.

Figure 6:
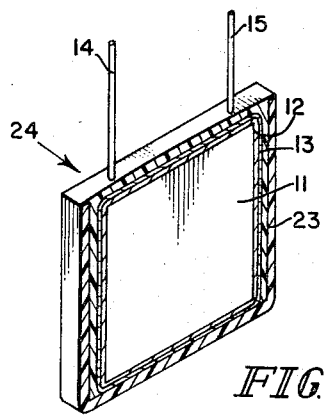
FIGURE 6 is a sectional view of the completed unit taken through section 6—6 of FIGURE 5.

In FIGURE 6 a cut-away view of the complete capacitor 24 taken through section 6—6 of FIGURE 5 (is shown). It can be seen that epoxy 23 is much thinner than the epoxy layer 17 in FIGURE 3 and therefore a smaller unit has been obtained. The units thus produced passed the same vibration tests as the units having the thicker protective housing. Hairpin leads may be utilized in this embodiment, which further simplifies the fabrication process. While either the embodiment represented by FIGURES 1–3 or the embodiment represented by FIGURES 4–6 is satisfactory, the latter is more economical and lends itself more readily to automation.

Figure 7:
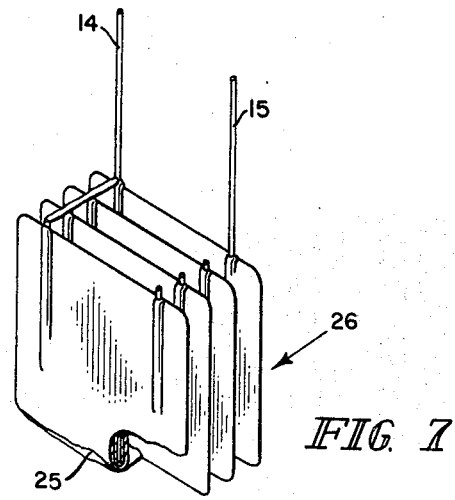
FIGURE 7 is a perspective view of a plurality of units in parallel so as to provide a higher capacitance.
Figure 8:
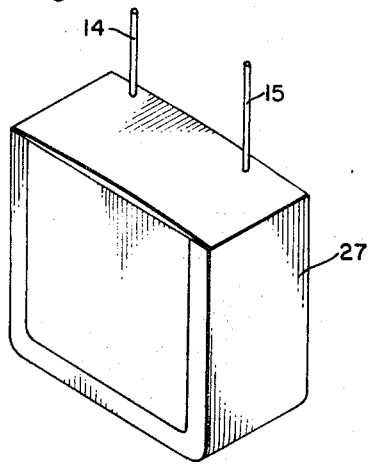
FIGURE 8 is a perspective view of the completed unit of FIGURE 7.

Units having a higher capacitance are readily attained by stacking a plurality of completed anodes, soldering the anode leads 14 together, joining the cathodes by silver epoxy 25 and then placing the stacked units into a suitable channel and completing the encapsulation. FIGURE 7 represents the stacked units 26 prior to encapsulation and FIGURE 8 represents a completed unit 27 having a plurality of capacitors in parallel therein. Another method of providing a plurality of capacitors in parallel is to carry out the operation as shown in FIGURES 4–6 and then merely interconnect the leads. A third method of providing higher capacitance readings has been to stack the etched foil, dip the stack in solder to join the anodes, attach the anode lead and process the anodes in the manner hereinabove described. The foil can also be rolled, corrugated, bent, etc., if desired to increase the capacitance.

The size of the capacitor is based on the plate size of the aluminum foil; therefore, a number of sizes are readily attainable. For extremely small units aluminum wire rather than foil is used. The aluminum wire in some cases produces a more economical unit than does the foil and higher operating voltages have been attained. The use of both wire and foil for anodes allows a wide range of solid electrolyte aluminum capacitors to be produced.

In order to emphasize the performance and advantages of the present invention, FIGURES 11–21 have been included which graphically illustrate the properties of the solid electrolyte aluminum capacitor produced by the present invention as opposed to existing solid tantalum capacitors and wet aluminum capacitors. Capacitors of various ratings have been tested to show performance trends and will be readily understood by those skilled in the art.

FIGURES 11 and 12 graphically illustrate that the solid aluminum capacitors perform like solid tantalum capacitors on a life test. It can be seen in FIGURE 11 that when foil processed according to the present invention but having a low etch ratio is subjected to a life test for 1000 hours at 85° C., the leakage decreases. It can be seen in FIGURE 12 the average leakage for the high-etch ratio foil is satisfactory even though the CV product is 3 times higher for the same size plate than the foil represented in graph 11. To date, the devices have satisfactorily undergone 2000 hours life testing.

In FIGURE 13 the impedance variations with frequency for solid tantalum and solid aluminum and wet aluminum capacitors is shown. It can be seen that in this aspect the performance of the aluminum capacitor provided by the present invention is identical to that of a known tantalum solid capacitor having a similar rating, both being superior to the wet aluminum capacitor.

In FIGURE 14, which is a graphic comparison of capacitance changes with temperature, the solid aluminum capacitor produced by the present invention shows a similar trend as does the tantalum capacitor. While the aluminum shows a ±10% variance of the tantalum performance, it is still within standard specifications for solid tantalum capacitors and comparable to the tantalum capacitors.

In FIGURE 15 it can be seen that while a 3.0 mfd./6 v. DC solid aluminum capacitor has a higher dissipation factor than a 6.8 mfd./6 v. DC solid tantalum above 0° C., it has a lower dissipation factor at temperatures below 0° C. Most of the units presently being fabricated do not exceed a dissipation factor of 2%, and all units meet solid tantalum specifications of 6% at 85° C.

Solid aluminum capacitors have exhibited similar changes in the dissipation factor with frequency as do the solid tantalum capacitors as shown in FIGURE 16.

In FIGURE 17, the leakage currents are compared. Once again, aluminum exhibits the same trend as do the tantalum capacitors, and are within the 0.01 microampere per microfarad $x$ volt limits for solid tantalum capacitors.

As can be seen in FIGURE 18, the capacitance of the solid aluminum capacitor does not vary as much with frequency as does the solid tantalum.

FIGURE 19 illustrates the stable capacitance of typical solid aluminum capacitors during life tests, and that the dissipation factor varies less than 2% on 2000 hour life tests and is within the 6% military limit for solid tantalum capacitors.

The aluminum solid capacitors of the present invention can withstand much higher reverse voltage for longer periods of time than can solid tantalum capacitors. FIGURE 20 shows the normal and reverse leakage current of an aluminum solid.

While the above graphs do not represent all ratings, they represent the minimum performance to be expected from the solid aluminum capacitors as hereinabove described. In all areas their performance does not vary more than ±10% of the solid tantalum capacitor performance and in some instances equals or excels the solid tantalums.

The advantage of the solid aluminum capacitor over solid tantalum capacitors are obvious. The cost of the devices is considerably lower than the cost of the solid tantalum capacitors. The aluminum is less expensive than tantalum. The aluminum devices do not need to be sintered as do the tantalum. The simplicity of the aluminum structure reduces the possibility of dielectric breakdown. Capacitance in a tantalum capacitor depends upon the sintering of powder particles. The formation solution must be impregnated into the anode to form an oxide in the crevices. With a flat piece of aluminum this is not necessary. Because of the reduced number of operations in the aluminum process as compared to the tantalum process, higher yields are obtained. A further advantage lies in the fact that all processing steps in making foil or or wire capacitors are less time consuming. The resulting aluminum capacitor meets the dissipation factor and leakage current requirements of military specifications for solid electrolytic tantalum capacitors. While some of the units may be slightly larger than comparable tantalums because of the channel housing, the use of feather weight epoxy produces a unit much lighter than the tantalum.

The capacitor produced by the present invention also has a number of advantages over existing aluminum capacitors known in the art. The outstanding advantage is that a highly satisfactory solid aluminum capacitor has been produced. A further advantage is that the solid aluminum capacitors are more volumetrically efficient than the rolled aluminum foil capacitors, that is, they are smaller and have a much lower leakage. The solid aluminums further are not damaged by temperature as are the wet aluminum capacitors. They also have a size advantage over ceramic capacitors of the same rating.

While the fabrication of a solid electrolyte aluminum foil capacitor has been described in conjunction with a particular housing structure, it is to be understood that any suitable housing or encapsulation means may be used. The purpose of the present invention is to produce a volumetrically efficient solid electrolyte aluminum capacitor having comparable characteristics and size to solid electrolyte tantalum capacitors of the same ratings.

Either aluminum foil or aluminum wire is applicable to the present invention. In order to produce units of greater capacitance, either the size of the foil or wire may be varied, or the material may be stacked as hereinabove described, folded, rolled, etc.

It is to be appreciated that the present invention resides primarily in the fabrication of solid electrolyte aluminum capacitors which were heretofore difficult to obtain and that any suitable housing may be employed. It will be readily apparent to those skilled in the art that certain modifications and variations may be practiced without departing from the scope of the invention. I consider all of these variations and modifications to be within the foregoing description and defined by the appended claims.

Having thus described my invention, I claim:

1. A solid electrolyte aluminum capacitor comprising:
  (a) an etched aluminum anode having an anode lead affixed thereto, the surface of said anode characterized by intercommunicating voids;
  (b) an electrolytically formed dielectric anodic film over the entire surface of said etched anode;
  (c) a protective film over said anodic film, said protective film being a conversion product of inorganic phosphates applied to the anodic film for preventing damage to said anodic film;
  (d) a layer of manganese dioxide in intimate contact with said protective film throughout said voids and including the exterior surface of said anode;
  (e) a layer of graphite overlying said layer of manganese dioxide;
  (f) a cathode coating in electrical contact with said layer of graphite, said cathode coating having a cathode lead attached thereto; and (g) a housing for said capacitor, said anode and cathode leads extending therefrom.

2. A solid electrolyte aluminum capacitor comprising:
(a) an etched aluminum foil anode having an anode lead affixed thereto; said foil having an etch ratio of at least 100:1 so as to provide intercommunicating voids in the surface of said anode;
(b) an electrolytically formed dielectric anodic film over the entire surface of said etched anode;
(c) a protective film over said anodic film, said protective film being a conversion product of a material selected from the group consisting of inorganic phosphates and chromates in solution applied to the anodic film;
(d) a solid electrolyte of manganese dioxide in intimate contact with said dielectric film throughout said voids and forming a continuous layer on the exterior surface of said anode;
(e) a layer of graphite overlying said layer of manganese dioxide;
(f) a cathode coating in electrical contact with said layer of graphite, said cathode coating having a cathode lead attached thereto; and
(g) a means for housing said capacitor, said anode and cathode leads extending therefrom.

3. A solid electrolyte aluminum capacitor comprising:
(a) an etched aluminum foil anode having an anode lead affixed thereto, said foil anode having an etch ratio of at least 100:1 so as to provide intercommunicating voids in the surface of said anode;
(b) an electrolytically formed dielectric anodic film over the entire surface of said etched anode;
(c) a protective film over said anodic film, said protective film being a conversion product of inorganic phosphates in solution applied to the anodic film for preventing damage to said anodic film;
(d) a solid electrolyte of manganese dioxide in intimate contact with said protective film throughout said voids and forming a continuous layer on the exterior surface of said anode;
(e) a layer of graphite overlying said layer of manganese dioxide;
(f) a cathode coating in electrical contact with said layer of graphite, said cathode coating having a cathode lead attached thereto; and
(g) a housing for said capacitor, said anode and cathode leads extending therethrough.

4. A solid electrolyte aluminum capacitor as claimed in claim 3, wherein said etched aluminum foil electrode is substantially flat.

5. A solid electrolyte aluminum capacitor comprising:
(a) a rolled etched aluminum foil anode having an anode lead affixed thereto, said foil anode having an etch ratio of at least 100:1 so as to provide intercommunicating voids in the surface of said anode;
(b) an electrolytically formed dielectric anodic film over the exposed surfaces of said etched anode;
(c) a protective film over said anodic film, said protective film being a conversion product of inorganic phosphates in solution applied to the anodic film for preventing damage to said anodic film;
(d) a solid electrolyte of manganese dioxide in intimate contact with said protective film throughout said voids and forming a continuous layer on the exterior surface of said anode;
(e) a layer of graphite overlying said layer of manganese dioxide;
(f) a cathode coating in electrical contact with said layer of graphite, said cathode coating having a cathode lead attached thereto; and
(g) a molded housing for said capacitor, said anode and cathode leads extending therefrom.

6. A solid electrolyte aluminum capacitor comprising:
(a) a folded etched aluminum foil anode having an anode lead affixed thereto, said foil anode having an etch ratio of at least 100:1 so as to provide intercommunicating voids in the surface of said anode;
(b) an electrolytically formed dielectric anodic film over the exposed surfaces of said etched anode;
(c) a protective film over said anodic film, said protective film being a conversion product of inorganic phosphates in solution applied to the anodic film for preventing damage to said anodic film;
(d) a solid electrolyte of manganese dioxide in intimate contact with said protective film throughout said voids and forming a continuous layer on the exterior surface of said anode;
(e) a layer of graphite overlying said layer of manganese dioxide;
(f) a cathode coating in electrical contact with said layer of graphite, said cathode coating having a cathode lead attached thereto; and
(g) a molded housing for said capacitor, said anode and cathode leads extending therefrom.

7. A solid electrolyte aluminum capacitor comprising:
(a) an aluminum wire anode having a first end and a second end, said first end being etched so as to provide an anode, said second end being unetched so as to provide an anode lead;
(b) an electrolytically formed dielectric anodic film over the exposed surfaces of said etched first end of said wire anode;
(c) a protective film over said anodic film, said protective film being a conversion product of inorganic phosphates applied to the anodic film for preventing damage to said anodic film;
(d) a solid electrolyte of manganese dioxide in intimate contact with said protective film and forming a continuous layer on the exterior surface of said anode;
(e) a layer of graphite overlying said layer of manganese dioxide;
(f) a cathode coating in electrical contact with said layer of graphite, said cathode coating having a cathode lead attached thereto; and
(g) a molded housing for said capacitor, said anode and cathode leads extending therefrom.

8. A solid electrolyte aluminium capacitor comprising:
(a) an aluminum wire anode having a first end and a second end, said first end being etched so as to provide an anode, said second end being unetched so as to provide an anode lead, said etched end having an etch ratio of at least 100:1 so as to provide intercommunicating voids in the surface of said anode;
(b) an electrolytically formed dielectric anodic film over the exposed surfaces of said etched first end of said wire anode;
(c) a protective film over said anodic film, said protective film being a conversion product of a material selected from the group consisting of inorganic phosphates and chromates in solution applied to the anodic film;
(d) a solid electrolyte of manganese dioxide in intimate contact with said dielectric film throughout said voids and forming a continuous layer on the exterior surface of said anode;
(e) a layer of graphite overlying said layer of manganese dioxide;
(f) a cathode coating in electrical contact with said layer of graphite, said cathode coating having a cathode lead attached thereto; and
(g) a molded housing for said capacitor, said anode and cathode leads extending therefrom.

9. A solid electrolyte aluminum capacitor unit comprising:
(a) a plurality of etched aluminum foil anodes having anode leads affixed thereto, said anodes being electrically connected in parallel and all but one of said leads being cut above the connection point, said foil anode having an etch ratio of at least 100:1 so as to provide intercommunicating voids in the surfaces of said anodes;

(b) an electrolytically formed dielectric anodic film over the exposed surfaces of said etched anode;

(c) a protective film over said anodic film, said protective film being a conversion product of inorganic phosphates in solution applied to the anodic film for preventing damage to said anodic film;

(d) a layer of manganese dioxide in intimate contact with said protective film throughout said voids and forming a continuous layer on the exterior surfaces of said anodes;

(e) a layer of graphite overlying said layer of manganese dioxide;

(f) a cathode coating in electrical contact with said layer of graphite, said cathodes being electrically connected in parallel and a cathode lead attached thereto; and (g) a molded housing means for said capacitor unit, said anode and cathode leads extending therefrom.

10. A process of fabricating a solid electrolyte aluminum capacitor comprising the steps of:

(a) etching an aluminum anode having an anode lead affixed thereto;

(b) forming said anode to provide a dielectric film thereon;

(c) immersing said formed anode in an aqueous solution containing up to 2% by weight of a salt selected from the group consisting of $Na_3PO_4$, $NA_2HPO_4$, $NaH_2PO_4$, $K_2CrO_4$, $K_2Cr_2O_7$, $Na_2CrO_4$ and $$Na_2Cr_2O_7;$$

(d) applying $Mn(NO_3)_2$ to said anode and converting said $Mn(NO_3)_2$ to $MnO_2$;

(e) providing a contact layer in intimate contact with said solid electrolyte;

(f) applying a cathode coating on said contact layer and affixing a lead thereto; and (g) enclosing the resulting capacitor in a suitable housing, said anode and cathode leads extending therefrom.

11. A process of fabricating a solid electrolyte aluminum capacitor comprising the steps of:

(a) etching an aluminum foil anode having an anode lead affixed thereto in a NaCl solution containing from 3%–15% boric acid by weight, said etching solution providing an etch ratio of at least 100:1 so as to provide intercommunicating voids on the surface of said anode;

(b) forming said anode to provide a dielectric film on the entire surface thereof;

(c) immersing said formed anode in an aqueous solution containing an inorganic salt selected from the group consisting of phosphates and chromates;

(d) applying $Mn(NO_3)_2$ to said anode and converting said $Mn(NO_3)_2$ to $MnO_2$ thereby providing a solid electrolyte for said anode;

(e) providing a graphite coating in intimate contact with said solid electrolyte;

(f) applying a cathode coating on said graphite coating and affixing a lead thereto; and (g) enclosing the resulting capacitor in a suitable housing.

12. A process of fabricating a solid electrolyte aluminum capacitor comprising the steps of:

(a) etching an aluminum foil anode having an anode lead affixed thereto in a NaCl solution containing from 3%–15% by weight of boric acid for at least 10 minutes at 95°–100° C., said etching solution providing intercommunicating voids on the entire surface of said anode;

(b) forming said anode to provide a dielectric film on the entire surface thereof;

(c) immersing said formed anode in a boiling aqueous solution containing up to 2% by weight of a salt selected from the group consisting of $Na_3PO_4$, $Na_2HPO_4$, $NaH_2PO_4$, $K_2CrO_4$, $K_2Cr_2O_7$, $Na_2CrO_4$ and $Na_2Cr_2O_7$;

(d) applying $Mn(No_3)_2$ to said anode and converting said $Mn(NO_3)_2$ to $MnO_2$;

(e) providing a graphite coating in intimate contact with said solid electrolyte;

(f) applying a cathode coating on said graphite layer and affixing a lead thereto; and (g) enclosing the resulting capacitor in a housing, said anode and cathode leads extending therefrom.

13. A process of fabricating a solid electrolyte aluminum capacitor comprising the steps of:

(a) etching a flat aluminum foil anode having a terminal in a NaCl solution containing from 3%–15% by weight of boric acid for about 10 minutes at 95°–100° C., said etching solution providing an etch ratio of at least 100:1 thereby providing intercommunicating voids on the entire surface of said anode;

(b) forming said anode in a phosphoric acid solution to provide an $Al_2O_3$ dielectric film thereon;

(c) immersing said formed anode in a boiling aqueous solution containing up to 2% by weight of a salt selected from the group consisting of $Na_3PO_4$, $Na_2HPO_4$, $NaH_2PO_4$, $K_2CrO_4$, $K_2Cr_2O_7$, $Na_2CrO_4$ and $Na_2Cr_2O_7$;

(d) applying $Mn(NO_3)_2$ to said anode and converting said $Mn(NO_3)_2$ to $MnO_2$ solid electrolyte at a temperature of 370°–375° C., said $MnO_2$ contacting said protective film throughout said voids and forming a continuous layer on the exterior surface of said anode;

(e) providing a graphite coating in intimate contact with said solid electrolyte;

(f) applying a cathode coating on said graphite layer and affixing a lead thereto; and (g) enclosing the resulting capacitor in a suitable housing.

14. A process of fabricating a solid electrolyte aluminum capacitor comprising the steps of:

(a) etching a flat aluminum foil anode having a terminal in a NaCl solution containing from 3%–15% by weight of boric acid for about 10 minutes at 95°–100° C., said etching solution providing an etch ratio of at least 100:1 thereby providing intercommunicating voids on the entire surface of said anode;

(b) forming said anode in a phosphoric acid solution to provide an $Al_2O_3$ dielectric film thereon;

(c) immersing said formed anode in a boiling aqueous solution containing up to 2% by weight of a salt selected from the group consisting of $Na_3PO_4$, $Na_2HPO_4$, $NaH_2PO_4$, $K_2CrO_4$, $K_2Cr_2O_7$, $Na_2CrO_4$ and $Na_2Cr_2O_7$;

(d) applying $Mn(NO_3)_2$ to said anode and converting said $Mn(NO_3)_2$ to $MnO_2$ solid electrolyte at a temperature of 370°–375° C., said $MnO_2$ contacting said protective film throughout said voids and forming a continuous layer on the exterior surface of said anode;

(e) providing a graphite coating in intimate contact with said solid electrolyte;

(f) applying a cathode coating on said graphite layer and affixing a lead thereto; and (g) positioning the resulting capacitor in a molded epoxy channel so that said anode and cathode leads extend therefrom, and pouring molten epoxy into said channel, said epoxy filling the voids surrounding said capacitor and coalescing with said molded channel thereby forming a housing for said capacitor.

15. A process of fabricating a solid electrolyte aluminum capacitor comprising the steps of:
  (a) etching a rolled aluminum foil anode having a terminal in a NaCl solution containing from 3%–15% by weight of boric acid for about 10 minutes at 95°–100° C., said etching solution providing an etch ratio of at least 100:1 thereby providing intercommunicating voids on the entire surface of said anode;
  (b) forming said anode in a phosphoric acid solution to provide an $Al_2O_3$ dielectric film thereon;
  (c) immersing said formed anode in a boiling aqueous solution containing up to 2% by weight of a salt selected from the group consisting of $Na_3PO_4$, $Na_2HPO_4$, $NaH_2PO_4$, $K_2CrO_4$, $K_2Cr_2O_7$, $Na_2CrO_4$ and $Na_2Cr_2O_7$;
  (d) applying $Mn(NO_3)_2$ to said anode and converting said $Mn(NO_3)_2$ to $MnO_2$ solid electrolyte at a temperature of 370°–375° C., said $MnO_2$ contacting said protective film throughout said voids and forming a continuous layer on the exterior surface of said anode;
  (e) providing a graphite coating in intimate contact with said solid electrolyte;
  (f) applying a cathode coating on said graphite layer and affixing a lead thereto; and
  (g) positioning the resulting capacitor in a molded epoxy channel so that said anode and cathode leads extend therefrom, and pouring molten epoxy into said channel, said epoxy filling the voids surrounding said capacitor and coalescing with said molded channel thereby forming a housing for said capacitor.

16. A process of fabricating a solid electrolyte aluminum capacitor comprising the steps of:
  (a) etching a folded aluminum foil anode having a terminal in a NaCl solution containing from 3%–15% by weight of boric acid for about 10 minutes at 95°–100° C., said etching solution providing an etch ratio of at least 100:1 thereby providing intercommunicating voids on the entire surface of said anode;
  (b) forming said anode in a phosphoric acid solution to provide an $Al_2O_3$ dielectric film thereon;
  (c) immersing said formed anode in a boiling aqueous solution containing up to 2% by weight of a salt selected from the group consisting of $Na_3PO_4$, $Na_2HPO_4$, $NaH_2PO_4$, $K_2CrO_4$, $K_2Cr_2O_7$, $Na_2CrO_4$, and $Na_2Cr_2O_7$;
  (d) applying $Mn(NO_3)_2$ to said anode and converting said $Mn(NO_3)_2$ to $MnO_2$ solid electrolyte at a temperature of 370°–375° C., said $MnO_2$ contacting said protective film throughout said voids and forming a continuous layer on the exterior surface of said anode;
  (e) providing a graphite coating in intimate contact with said solid electrolyte;
  (f) applying a cathode coating on said graphite layer and affixing a lead thereto; and
  (g) positioning the resulting capacitor in a molded epoxy channel so that said anode and cathode leads extend therefrom, and pouring molten epoxy into said channel, said epoxy filling the voids surrounding said capacitor and coalescing with said molded channel thereby forming a housing for said capacitor.

17. A process of fabricating a solid electrolyte aluminum capacitor comprising the steps of:
  (a) etching a portion of aluminum wire in a NaCl solution containing from 3%–15% by weight of boric acid for at least 10 minutes at 95°–100° C., said etching solution providing an etch ratio of at least 100:1, said etched portion being an anode, said unetched portion being an anode lead;
  (b) forming said wire anode in a phosphoric acid solution to provide an $Al_2O_3$ dielectric film thereon;
  (c) immersing said formed anode in a boiling aqueous solution containing up to 2% by weight of a salt selected from the group consisting of $Na_3PO_4$, $Na_2HPO_4$, $NaH_2PO_4$, $K_2CrO_4$, $K_2Cr_2O_7$, $Na_2CrO_4$, and $Na_2Cr_2O_7$;
  (d) applying $Mn(NO_3)_2$ to said anode and converting said $Mn(NO_3)_2$ to $MnO_2$ solid electrolyte at a temperature of 370°–375° C.;
  (e) providing a graphite coating for said anode, said coating being in intimate contact with said $MnO_2$ solid electrolyte;
  (f) applying a cathode coating on said graphite coating and affixing a lead thereto; and
  (g) enclosing the resulting capacitor in a suitable housing.

18. An aluminum electrolytic capacitor comprising an anode of aluminum metal characterized by a multiplicity of microscopic intercommunicating voids having a dielectric film formed thereon, a first terminal for said anode, a protective film over said dielectric film for substantially preventing damage to said dielectric film, said protective film being a conversion product of a material selected from the group consisting of the phosphates and chromates, a solid electrolyte in said voids and in contact with said protective film, a second terminal in the form of a conducting layer on the exterior surfaces of said anode and in contact with said solid electrolyte.

19. An aluminum capacitor as claimed in claim 18, wherein said material is an inorganic salt selected from the group consisting of the phosphates and chromates.

20. An aluminum capacitor as claimed in claim 18, wherein said aluminum has an etch ratio of at least 100:1.

21. An aluminum capacitor as claimed in claim 18, wherein a contact layer is interposed between said solid electrolyte and said second terminal.

22. An aluminum capacitor as claimed in claim 18, wherein said dielectric film is aluminum oxide, said solid electrolyte is manganese dioxide and said contact layer is graphite.

23. An aluminum electrolytic capacitor comprising an anode of aluminum metal having an etch ratio of at least 100:1 and comprising a multiplicity of microscopic intercommunicating voids having a dielectric film formed thereon, a protective film over said dielectric film for substantially preventing damage to said dielectric film, said protective film being a conversion product of an inorganic material selected from the group consisting of phosphates and chromates, a first terminal for said anode, a solid electrolyte in said voids and in contact with said protective film, a second terminal in the form of a conducting layer on the exterior surfaces of said anode and in contact with said solid electrolyte.

24. A process for fabricating an aluminum capacitor comprising the steps of: etching an aluminum anode having a terminal in a bath, forming a dielectric oxide film on said anode, immersing said formed anode in an aqueous solution containing an inorganic salt selected from the group consisting of phosphates and chromates to form a protective film over said oxide film, applying a semiconductive electrolyte layer over said protective film, providing a cathode coating on said semiconductive layer and affixing a cathode lead thereto, and enclosing the capacitor in a housing.

25. The process for fabricating an aluminum capacitor as claimed in claim 24, including the additional step of applying a contact layer over said semiconductive electrolyte layer.

26. The process for fabricating an aluminum capacitor as claimed in claim 24, wherein said bath is comprised of a NaCl solution containing boric acid.

27. A process for fabricating an aluminum capacitor comprising the following steps: etching an aluminum anode having a terminal in a NaCl solution containing boric acid, said etching solution providing an etch ratio of at least 100:1 so as to provide intercommunicating voids in said anode, forming a dielectric oxide film on said anode, immersing said formed anode in an aqueous solution containing an inorganic salt selected from the group consisting of phosphates and chromates, applying a semi-conductive electrolyte over said protective film, providing a contact coating in contact with said solid electrolyte, applying a cathode coating on said contact layer and affixing a cathode lead thereto, and enclosing the capacitor in a housing.

28. The process for fabricating an aluminum capacitor as claimed in claim 27, wherein said etching solution contains 3–15% by weight boric acid, the remainder NaCl.

References Cited

UNITED STATES PATENTS

| | | | |
|---|---|---|---|
| 2,066,912 | 1/1937 | Ruben | 317—230 |
| 2,755,237 | 7/1956 | Turner | 317—230 |
| 2,934,681 | 4/1960 | Ross | 317—230 |
| 3,266,962 | 8/1966 | Post | 317—230 |
| 3,292,053 | 12/1966 | Giacomo | 317—230 |
| 3,308,350 | 3/1967 | Smyth et al. | 317—230 |

FOREIGN PATENTS 439,479  12/1935  Great Britain.

JAMES D. KALLAM, *Primary Examiner.*